United States Patent [19]

Yamada

[11] Patent Number: 5,706,702

[45] Date of Patent: Jan. 13, 1998

[54] CONTROLLER FOR OPERATION OF TRANSMISSION IN MOTOR CAR

[75] Inventor: Seiji Yamada, Seto, Japan

[73] Assignee: Chuouhatsujo Kabushiki Kaisha, Nagoya, Japan

[21] Appl. No.: 668,281

[22] Filed: Jun. 26, 1996

[30] Foreign Application Priority Data

Jun. 28, 1995 [JP] Japan ..................... 7-186367

[51] Int. Cl.$^6$ .................................. F16H 59/04
[52] U.S. Cl. ........................... 74/473 R; 74/501.6
[58] Field of Search ............. 74/473 R, 473 SW, 74/501.6

[56] References Cited

U.S. PATENT DOCUMENTS 3,600,966  8/1971  Anderson ............... 74/501.5 R X

FOREIGN PATENT DOCUMENTS 62-238120  10/1987  Japan .

Primary Examiner—Allan D. Herrmann
Attorney, Agent, or Firm—Emmanuel J. Lobato; Burns & Lobato, P.C.

[57] ABSTRACT

Here is disclosed a controller for operation of transmission in motor car comprising a control cable (14) of triple structure consisting of a outer tube (15), an inner tube (16) slidably inserted into the outer tube (15) and a length of wire (17) slidably inserted into the inner tube (16), characterized by that any one end of the outer tube (15) is fixed to a car body, one end of any one of the inner tube (16) and the wire (17) is engaged with a SELECT mode operating mechanism provided adjacent a control lever (6) while one end of the other one of the inner tube (16) and the wire (17) is engaged with a SHIFT mode operating mechanism also provided adjacent the control lever (6), the other end of the outer tube (15) is fixed to a transmission casing, the other end of any one of the inner tube (16) and the wire (17) is engaged with a SELECT mode operating mechanism provided adjacent a transmission unit while the other end of the other one of the inner tube (16) and the wire (17) is engaged with a SHIFT mode operating mechanism provided adjacent the transmission unit.

7 Claims, 10 Drawing Sheets

CONTROLLER FOR OPERATION OF TRANSMISSION IN MOTOR CAR

BACKGROUND OF THE INVENTION

1. Field of the Invention

The present invention relates generally to motor vehicle transmission operation and more particularly to a controller for remote operation and control of the transmission in a motor car utilizing a single control cable comprising an outer tube, an inner tube slidably driven longitudinally in the outer tube and a length of wire driven longitudinally in the inner tube.

2. Description of the Prior Art

A pair of control cables respectively for SELECT mode operation and SHIFT mode operation have conventionally been used heretofore in order to transmit operating forces from a control lever to a motor vehicle transmission unit, but such an arrangement of the prior art has been inconvenient for operation of wiring within a space-limited engine compartment. To overcome this inconvenience, Japanese Patent Application Disclosure Gazette No. 1987-238120 discloses an arrangement using a single control cable of triple tube structure, and in which a lower end of a control lever is supported by a spherical bearing in a manner such that the control lever can rock back and forth as well as rightward and leftward. An inner tube of the control cable is fixed to the motor car body, an end of a wire is connected to the control lever so that an operating force in a SHIFT-direction may be transmitted to the transmission unit as the control lever rocks back and forth and a rocking arm projecting laterally from a spherical body of the spherical bearing is connected to an outer tube by means of a bell crank so that an operating force in a SELECT-direction may be transmitted to the transmission unit as the control lever rocks rightward and leftward.

However, it is difficult to install such an arrangement on the motor vehicle body since the outermost tube is required to be actuated and operation of wiring is troublesome since the arrangement readily comes in contact with the other parts existing within the engine compartment and results in wearing.

SUMMARY OF THE INVENTION

It is a principal object of the present invention to provide a controller having a control lever mechanism using a single control cable of triple structure having an outermost tube fixed to a car body as well as to a transmission casing, an inner tube and a length of wire both slidably driven so as to transmit operating forces in SELECT- and SHIFT-directions, respectively, and suitable to drive the control cable.

The object set forth above is achieved, according to the invention, by a controller for operation of the transmission in a motor vehicle comprising a control cable of triple structure consisting of an outer tube, an inner tube slidably driven longitudinally in the outer tube and a length of wire slidably driven longitudinally in the inner tube. One end of the outer tube is fixed to the car body, one end of either of the inner tube and the wire is engaged with a SELECT mode operating mechanism provided with a control lever while one end of the other one of said inner tube and the wire is engaged with a SHIFT mode operating mechanism also provided adjacent the control lever. The other end of the outer tube is fixed to a transmission casing, the other end of either of the inner tube and the wire is engaged with a SELECT mode operating mechanism provided adjacent a transmission unit while the other end of either of the inner tube and the wire is engaged with a SHIFT mode operating mechanism provided adjacent the transmission unit.

The invention of the above-mentioned arrangement provides various advantages. First, there is no apprehension that the control cable might be worn due to contact with various parts existing within the motor car body as well as within the engine compartment, since the outermost tube is fixed to the car body and to the transmission casing. Second, the operation of wiring within the spaced-limited engine compartment is facilitated in comparison with the case in which a pair of separate control cables is used for SELECT mode operation and SHIFT mode operation, respectively. Finally, use of a slide shaft allows, even within a limited space, operating forces in SELECT- and SHIFT-directions to be effectively transmitted from the control lever to the inner tube or the length of wire therein.

DESCRIPTION OF THE PREFERRED EMBODIMENTS

Figure 1:
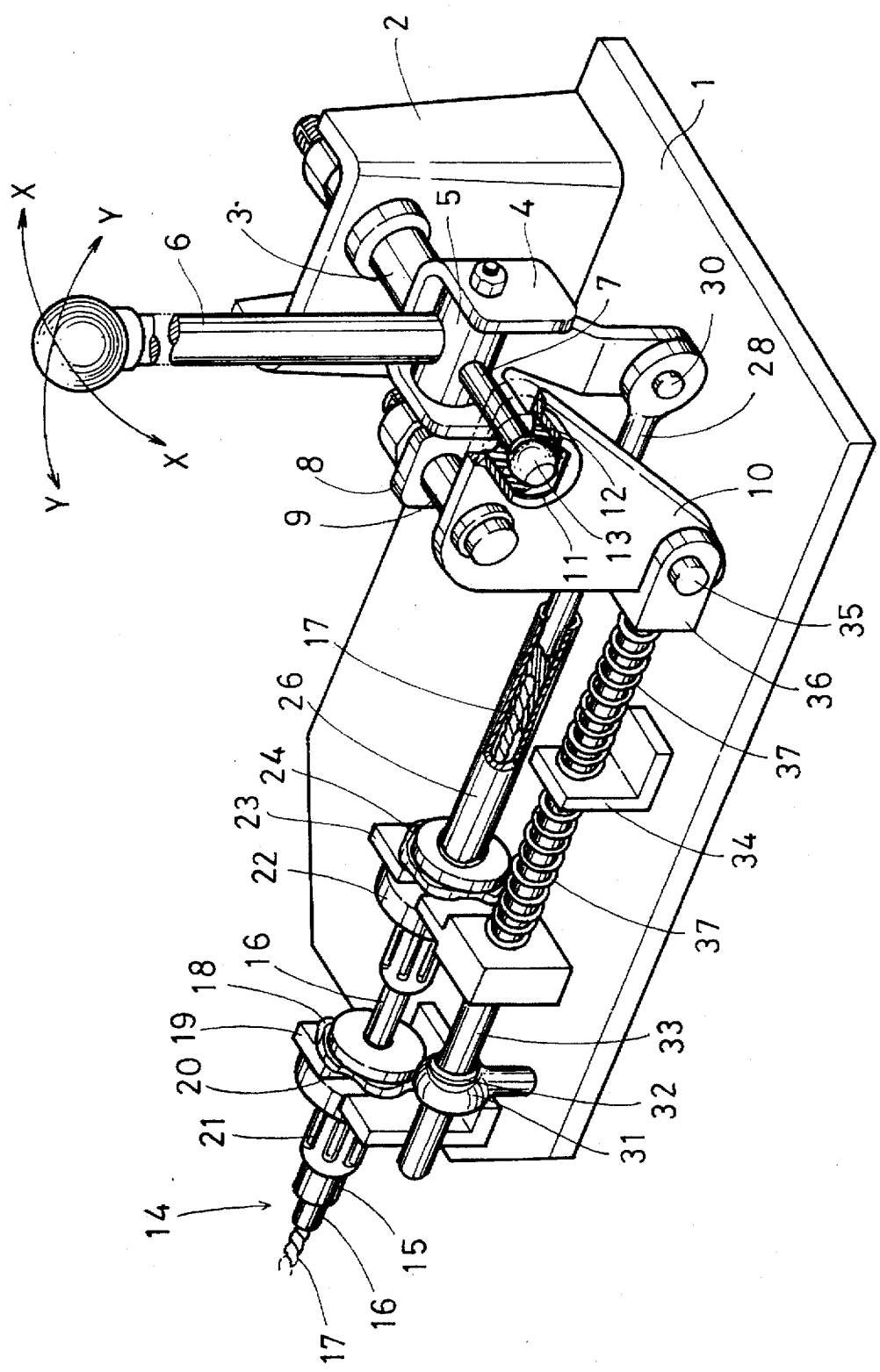
FIG. 1 is a perspective view illustrating an embodiment of the controller control lever mechanism, according to the invention, in the proximity of a motor vehicle control lever.

The invention will be better understood from the following description of the several embodiments made in reference to the accompanying drawings in which similar or corresponding parts have same reference numerals.

Figure 2:
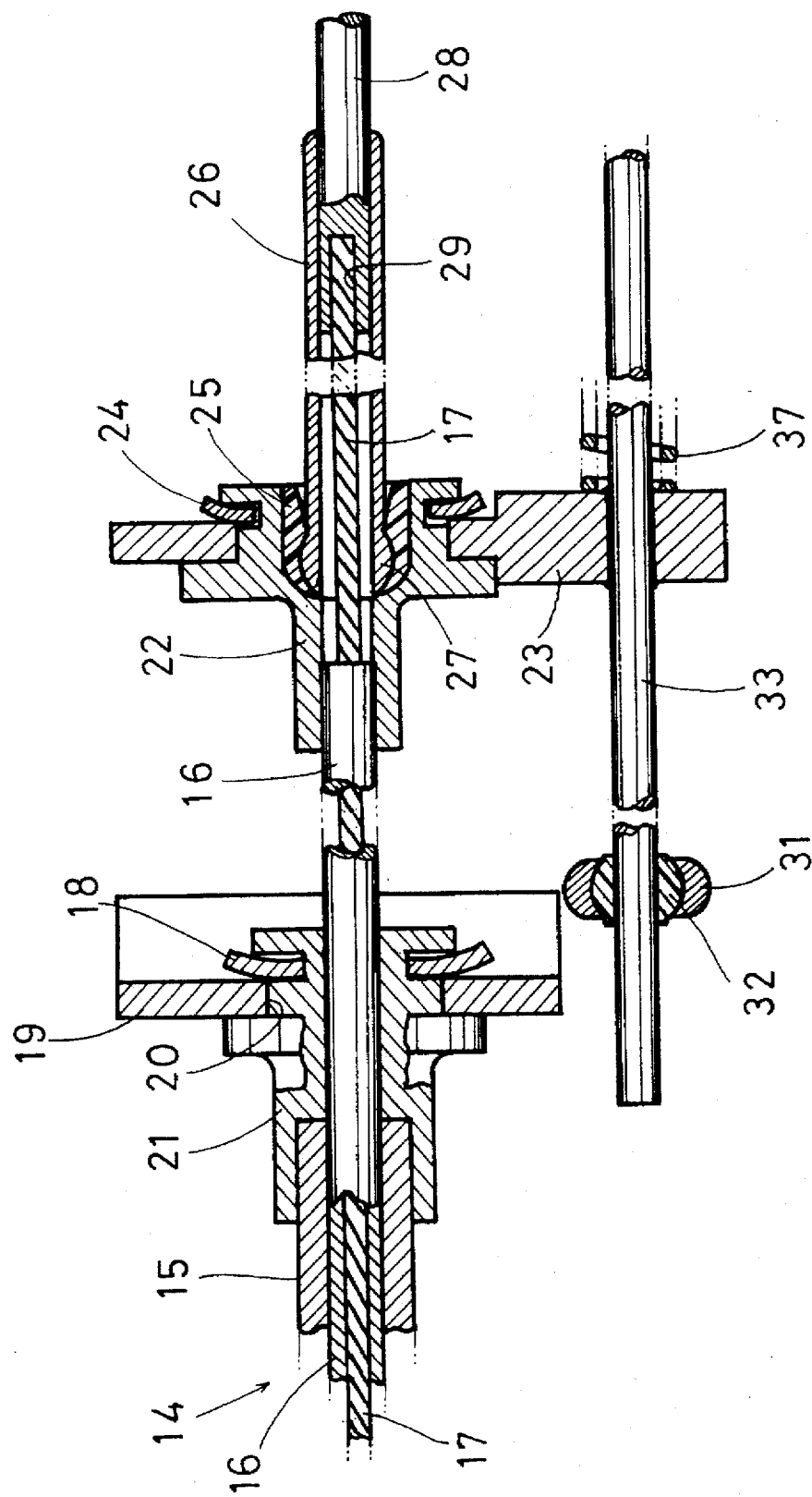
FIG. 2 is a horizontal sectional view corresponding to FIG. 1.

Referring to FIGS. 1 and 2 illustrating an embodiment of the control lever mechanism of a controller 100 according to the invention, a base 1, fixed to a car body (not shown), is provided adjacent its rear end with an upright bracket 2 standing thereon to support a first shaft 3 in such a manner that the first shaft 3 is rotatable but axially immovable. A first rocking arm 4 having an upper end as a square U-shaped cross-section is fixed to the forward end of the first shaft 3 and rotatably supports a second shaft 5 which extends across the first rocking arm 4 adjacent its upper end perpendicularly to the first shaft 3.

A control lever 6 extends upwardly from the second shaft 5 so as to be upright when it is in a neutral position, on the one hand, and a second rocking arm 7 extends horizontally, on the other hand.

The base 1 is provided adjacent the first-mentioned bracket 2 with a bracket 8 also standing upright thereon to support a horizontal shaft 9 extending parallel to the first shaft 3. This horizontal shaft 9 pivotally supports a bell crank 10 which is provided, in turn, on one end with a cylindrical projection 11 for slidably receiving a slidable cylinder 12 which is, in turn, adapted to receive a spherical head 13 formed on a forward end of the second rocking arm 7 in a manner such that the spherical head 13 can oscillate within the slidable cylinder 12.

Reference numeral 14 designates a control cable of triple structure comprising an outer tube 15, an inner tube 16 slidably driven longitudinally in the outer tube 15 and a length of wire 17 slidably driven longitudinally in the inner tube 16. A first cylindrical fixture 21 caulked on an end of the outer tube 15 is received by a U-shaped groove 20 formed in a bracket 19 extending upright from the base 1 adjacent its forward end and secured in the U-shaped groove 20 by means of a clip 18.

A second cylindrical fixture 22 is caulked on an end of the inner tube 16 having been slidably passed through the first cylindrical fixture 21, then received by a movable bracket 23 as will be described later and secured by a clip 24 to the bracket 23.

A spherical head 27 of a sleeve 26 is received by the second cylindrical fixture 22 with interposition of a cylindrical bushing 25 in a manner such that the sleeve 26 can oscillate. A rod 28 slidably inserted into the sleeve 26 is formed with a central cavity 29. A forward end of the wire 17 is fitted in the cavity 29 and fixed therein by caulking. A forward end of the rod 28 is connected to the lower end of the first rocking arm 4 by means of a pin 30.

The base 1 is additionally provided adjacent its forward end and its one side with a bracket 31 also standing upright thereon and a slide shaft 33 extending through this bracket 31 is supported by means of a spherical bushing 32 in a manner such that the slide shaft 33 can axially slide and can oscillate.

This slide shaft 33 extends loosely through a standing board 34 provided upright on the base 1 and mounts a forked end 36 defining a forward end of the slide shaft 33 connected to the other end of the bell crank 10 by means of a pin 35. The slide shaft 33 fixedly extends through the movable bracket 23 also and has provided therearound compression coiled springs 37, 37 extending between the standing board 34 and the movable bracket 23 and between the standing board 34 and the forked end 36, respectively.

With this specific embodiment constructed as has been described above, the control lever 6 is transversely (in an X—X direction in FIG. 1) rocked, i.e., in SELECT mode, causing the second rocking arm 7 to rock away from the horizontal together with the second shaft 5 caused to rock rotationally and thereby causing the bell crank 10 to rock around the horizontal shaft 9, whereupon the slide shaft 33 as well as the movable bracket 23 move longitudinally. As a result, the inner tube 16 slidably moves within the outer tube 15 and actuates a SELECT mode operating member for the transmission unit.

The second rocking arm 7 is smoothly engaged with the bell crank 10 as the slide cylinder 12 slidably moves and the spherical head 13 rotates. Rocking movement of the slide shaft 33 possibly occurring due to the rocking movement of the bell crank 10 is absorbed by the bushing 32 rotating within the bracket 31. The compression coiled springs 37, 37 bias the control lever to restore its neutral position.

During this SELECT mode operation, no movement of the first rocking arm 4 occurs and therefore no SHIFT mode operation is performed. Now the control lever 6 is longitudinally (in a Y—Y direction in FIG. 1) rocked, i.e., in SHIFT mode, causing the first rocking arm 4 to rock back and forth so that the wire 17 is slidably moved together with the rod 28 within the inner tube 16 and drives a SHIFT mode operating member of the transmission unit.

During this SHIFT mode operation, rocking movement of the rod 28 possibly occurring due to the rocking movement of the first rocking arm 4 is absorbed by oscillation of the sleeve 26 and a potency tending to bring the second rocking arm 7 into engagement with the bell crank 10 in an oblique direction as the control lever 6 is rocked form a position titled in the direction of the SELECT mode to a new position in the direction of a SHIFT mode is absorbed by slidable movement of the slide cylinder and rotation of the spherical head 13.

Figure 3:
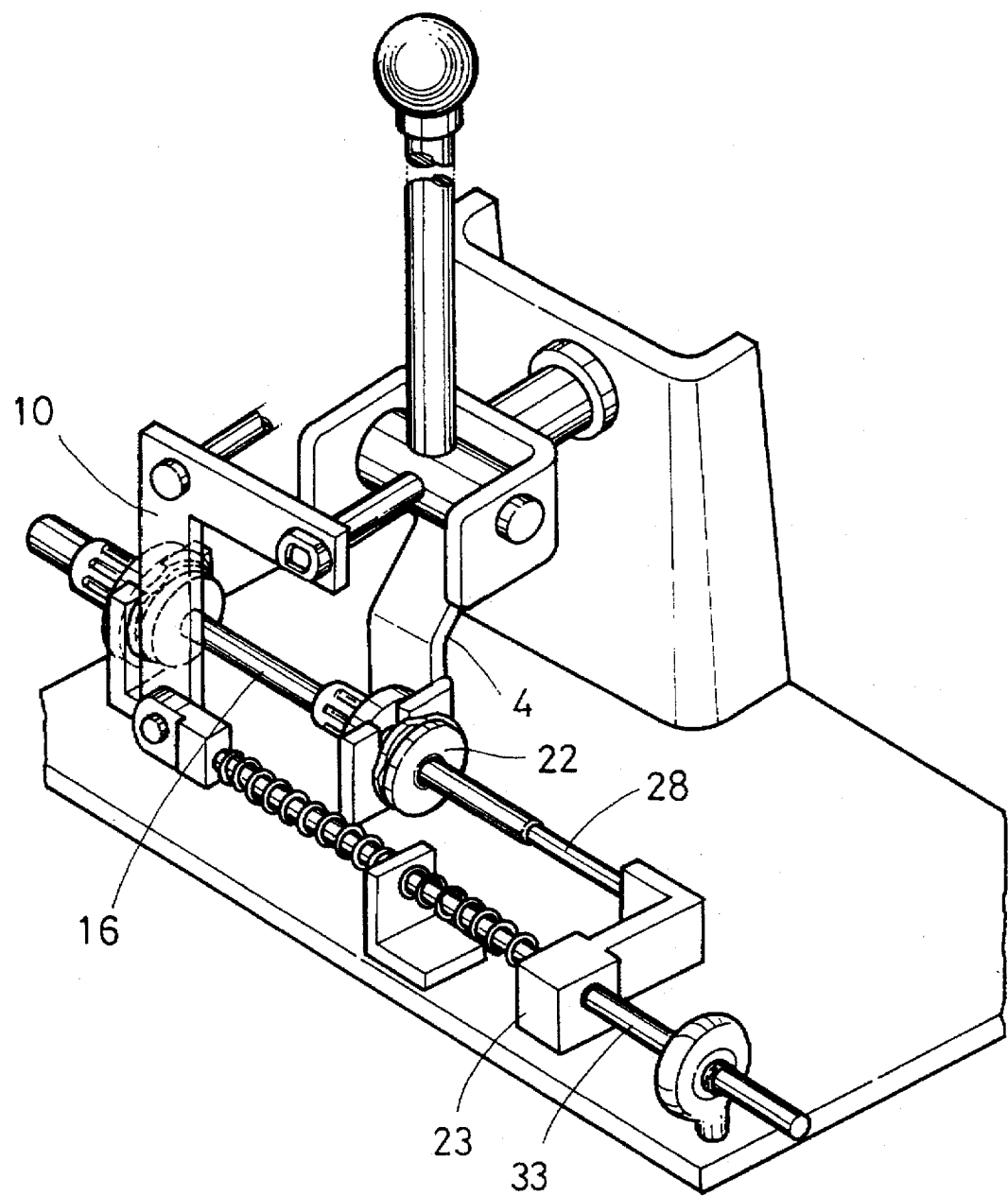
FIG. 3 is a perspective view similar to FIG. 1, illustrating a variant of the controller control lever mechanism.

An embodiment partially shown in FIG. 3 is similar to the embodiment of FIGS. 1 and 2 except that an operating force in the SHIFT-direction is transmitted by the inner tube 16 driven by the first rocking arm 4 through the aid of the second cylindrical fixture 22 while an operating force in the SELECT-direction is transmitted by the wire (not shown) driven by the slide shaft 33, the movable bracket 23 and the rod 28 as the bell crank 10 rocks.

Figure 4:
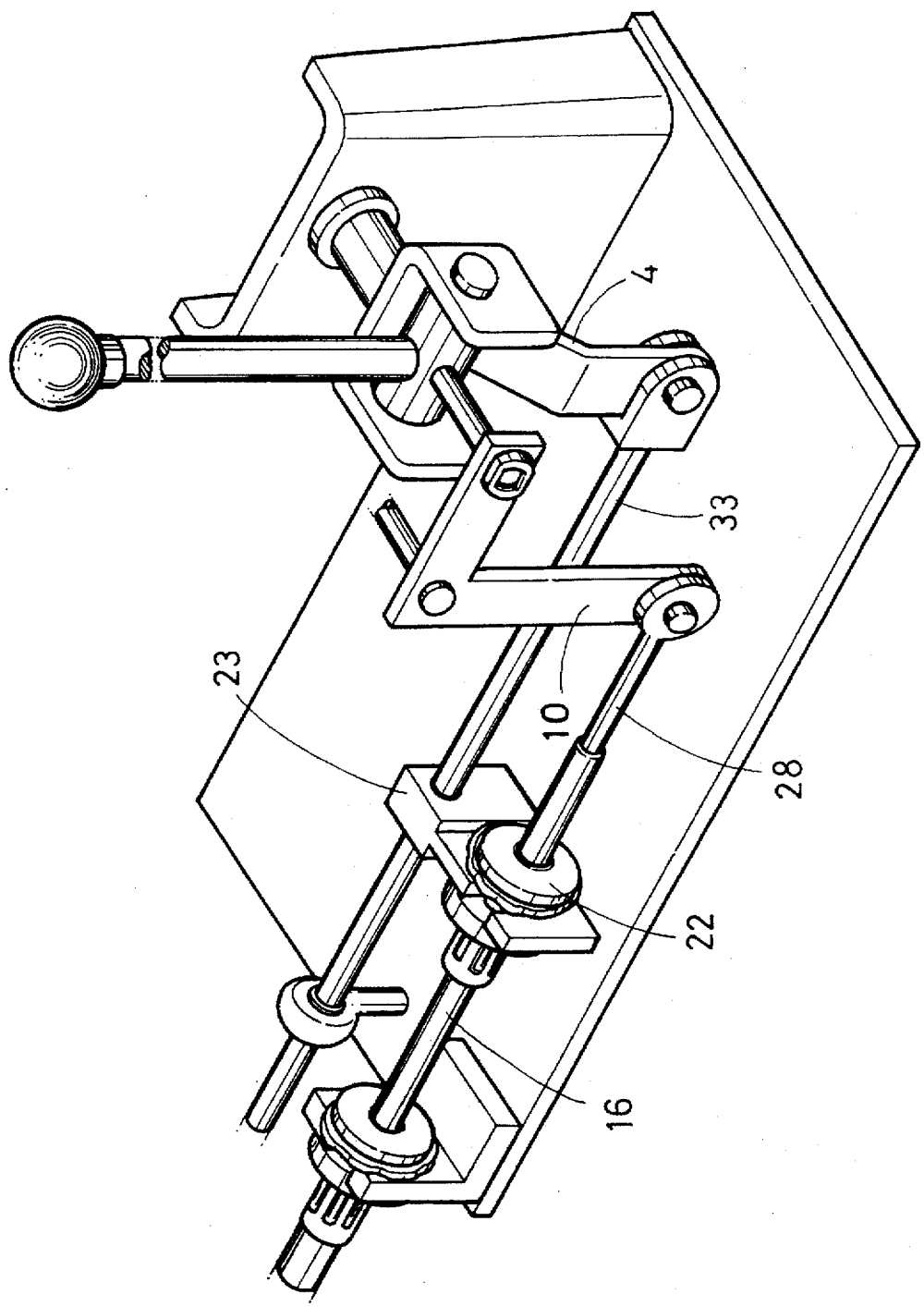
FIG. 4 is a perspective view similar to FIG. 1, fragmentarily illustrating another variant of the controller control lever mechanism.

An embodiment fragmentarily shown in FIG. 4 is similar to the embodiment of FIGS. 1 and 2 except that the operating force in the SHIFT-direction is transmitted by the inner tube 16 driven by the first rocking arm 4 through the aid of the slide shaft 33, the movable bracket 23 and the second cylindrical fixture 22 while the operating force in the SELECT-direction is transmitted by the wire (not shown) driven by the rod 28 as the bell crank rocks.

Figure 5:
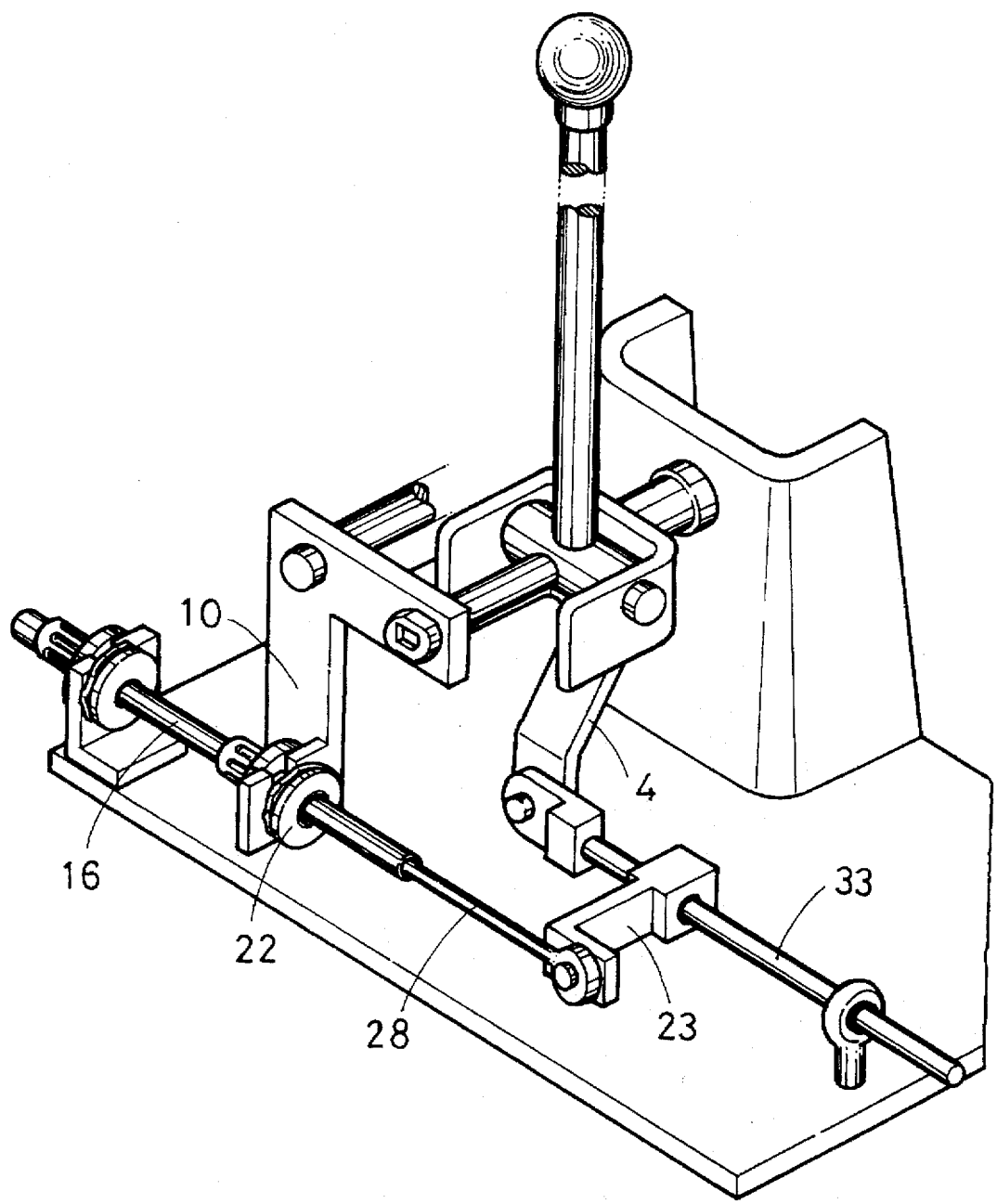
FIG. 5 is a perspective view similar to FIG. 1, fragmentarily illustrating still another variant of the controller control lever mechanism.

An embodiment fragmentarily shown by FIG. 5 is similar to the embodiment of FIGS. 1 and 2 except that the operating force in the SHIFT-direction (not shown) driven by the first rocking arm 4 through the aid of the slide shaft 33, the movable bracket 23 and the rod 28 while the operating force in the SELECT-direction is transmitted by the inner tube 16 through the aid of the second cylindrical fixture 22 as the bell crank 10 rocks.

Figure 6:
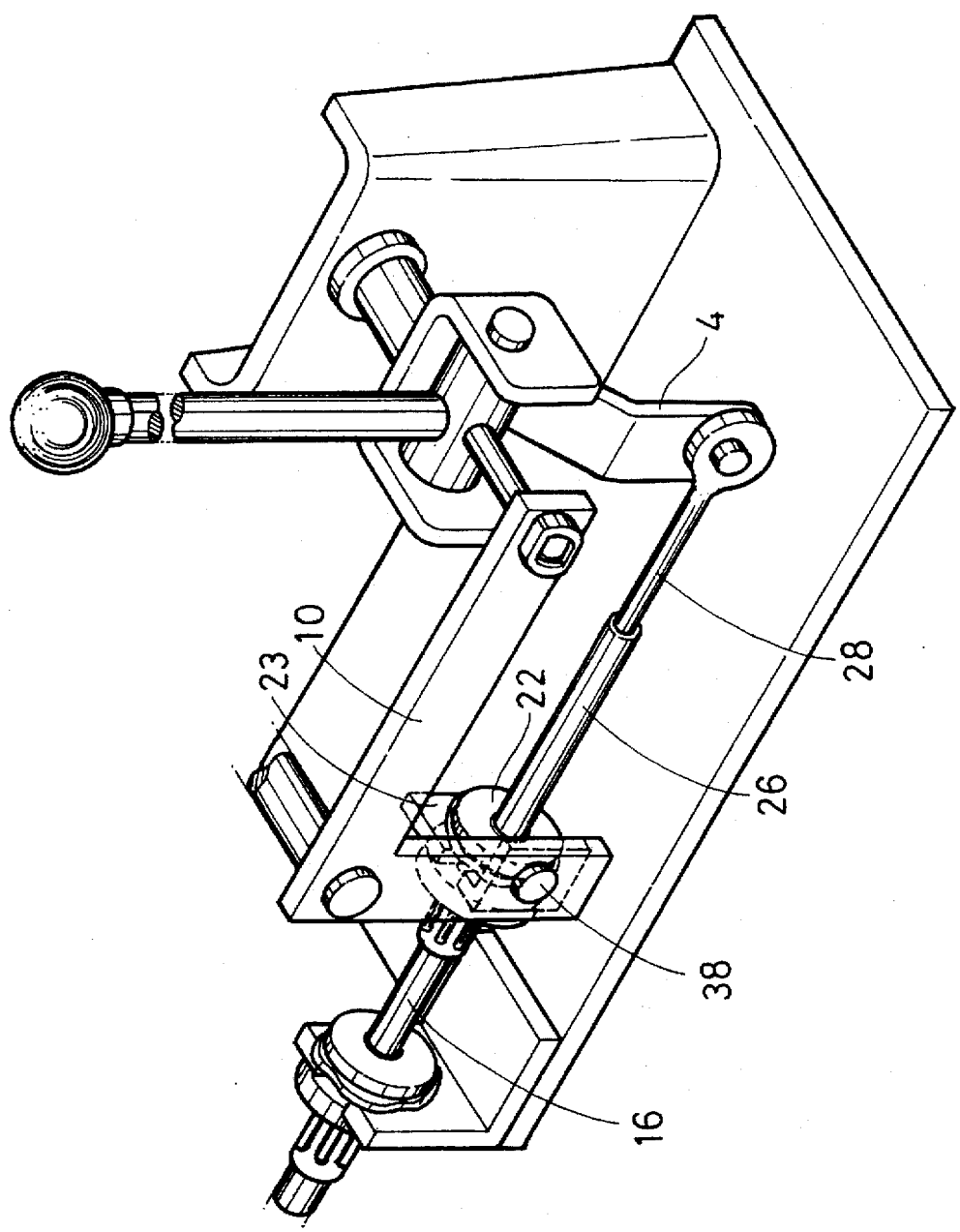
FIG. 6 is a perspective view similar to FIG. 1, fragmentarily illustrating another variant of the controller control lever mechanism.

An embodiment fragmentarily shown by FIG. 6 is similar to the embodiment of FIGS. 1 and 2 except that the operating force in the SHIFT-direction is transmitted by the wire (not shown) driven by the first rocking arm 4 through the aid of the rod 28 while the operating force in the SELECT-direction is transmitted by the inner tube 16 driven through the movable bracket 23 coupled to the inner tube 16 by means of a pin 38 and the second cylindrical fixture 22 coupled to the movable bracket 23 as the bell crank 10 rocks.

Figure 7:
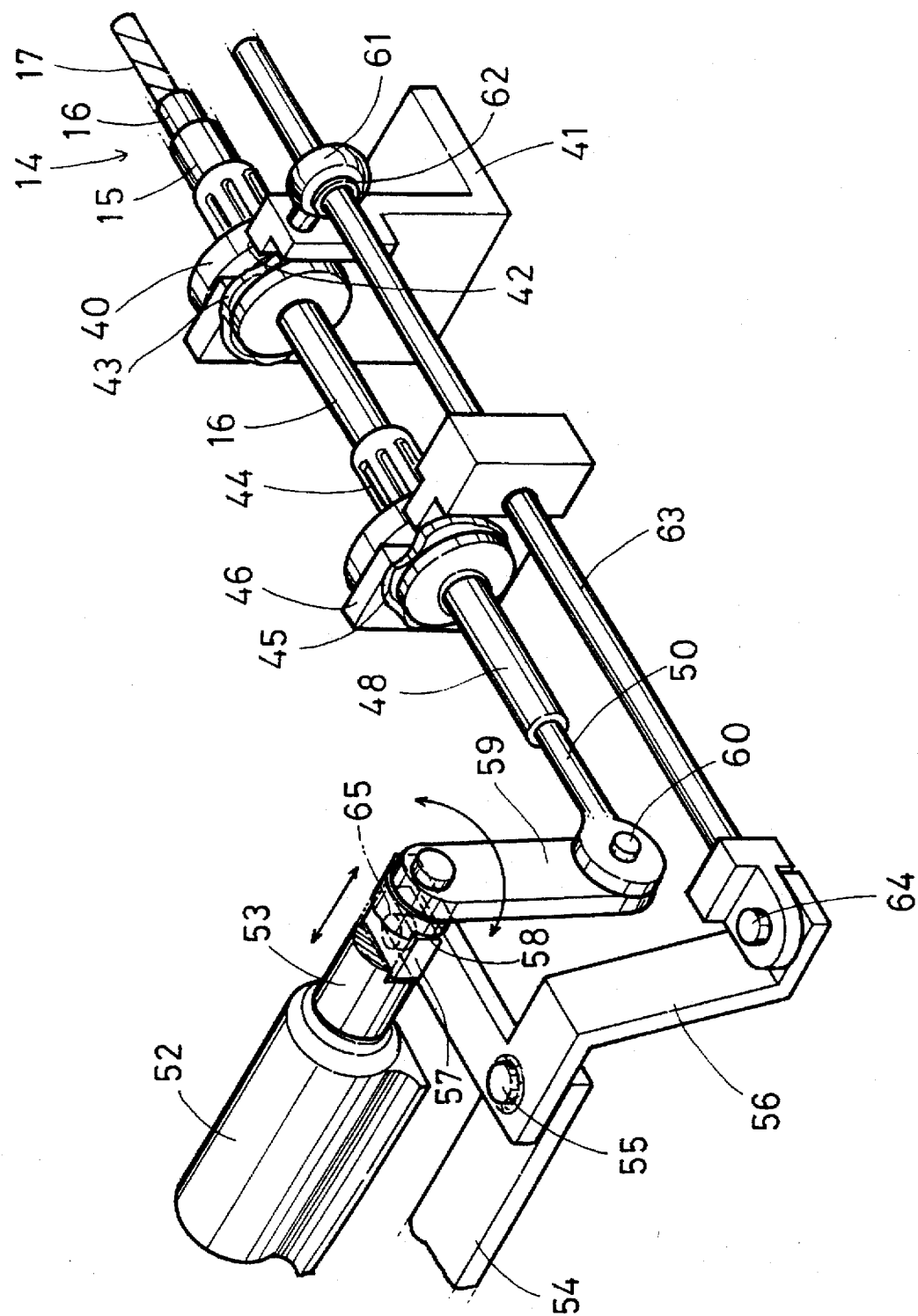
FIG. 7 is a perspective view fragmentarily illustrating an embodiment of the controller control lever mechanism in association with a transmission unit to be controlled.
Figure 8:
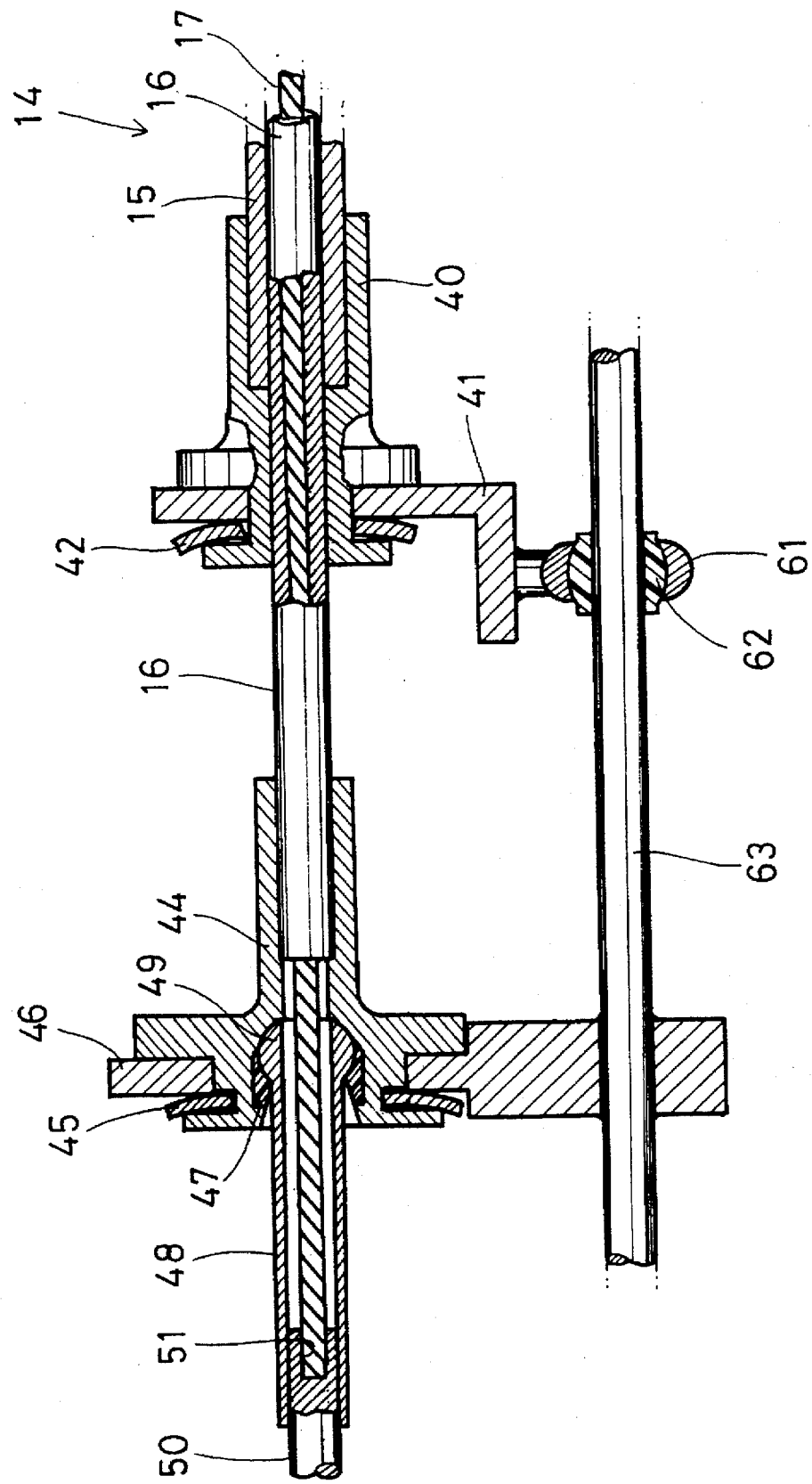
FIG. 8 is a horizontal sectional view corresponding to of the operating mechanism of FIG. 7.

FIGS. 7 and 8 show fragmentarily a variant of the inventive controller control lever mechanism in the proximity of the transmission unit. According to this variant also, the inner tube 16 is slidably inserted into the outer tube 15 and the wire 17 is slidably inserted into the inner tube 16 so as to form the control cable 14 of triple structure. A first cylindrical fixture 40 is fixed around an end of the outer tube 15 by caulking, then received by an U-shaped groove 42 of a bracket 41 fixed to a transmission casing (not shown) and fixed therein by means of a clip 43.

A second cylindrical fixture 44 is fixed around an end of the inner tube 16 extending from the first cylindrical fixture 40 by caulking and fixed to a movable bracket 46, as will be described later, by means of a clip 45.

A spherical head 49 of a sleeve 48 is received by the second cylindrical fixture 44 with interposition of a cylindrical bushing 47 so that the sleeve 48 held thereby can oscillate. The forward end of the wire 17 is fitted into a cavity 51 axially formed in a rod 50 slidably inserted into the sleeve 48 and fixed therein by caulking.

Referring to FIG. 7, reference numeral 52 designates guide means formed on the transmission casing and the transmission unit is driven either in the SELECT-direction or in the SHIFT-direction as a shaft 53 extending from the guide means 52 moves back and forth or rotates around its own axis, respectively. A bell crank 56 pivotally supported by a pivot pin 55 on a bracket 54 is provided on its one end with a square piece 57 supported thereon by a shaft 65 so that the square piece 57 may be slidably received by a groove 58 formed in a lower surface of the shaft 53. A forward end of the rod 50 is connected to a lower end of an arm 59 by means of a pin 60 and the arm 59 is fixed to a forward end of the shaft 53.

A support arm 61 laterally projecting from the bracket 41 slidably supports a slide shaft 63 by means of a spherical bushing 62 and the slide shaft 63 is provided on its intermediate portion with the movable bracket 46 fixed thereto and on its forward end with the other end of the bell crank 56 connected thereto by means of a pin 64.

With this variant constructed as has been described above, the wire 17 is moved back and forth by operating the control lever 6 in one direction so that the rod 50 is moved back and forth within the sleeve 48 and thereby the shaft 53 is rocked together with the arm 59 in order to transmit an operating force in the SELECT-direction to the transmission unit, and the inner tube 16 is moved back and forth by operating the control lever 6 in the other direction so that the slide shaft 63 is moved back and forth together with the movable bracket 46 and thereby the shaft 53 is moved back and forth as the bell crank 56 rocks in order to transmit an operating force in the SHIFT-direction to the transmission unit.

Rocking movement of the rod 50 possibly occurring due to the rocking movement of the arm 56 is absorbed by rocking movement of the sleeve 48 around the spherical head 49 and rocking movement of the slide shaft 63 possibly occurring due to rocking movement of the bell crank 56 is absorbed by rotation of the spherical bushing 62 with interposition of which the slide shaft 63 is supported by the support arm 61. Additionally, a potency tending to bring the bell crank 56 into engagement with the shaft 53 in an oblique direction is absorbed by rotation as well as slidable movement of the square piece 57 within the groove 58.

Figure 9:
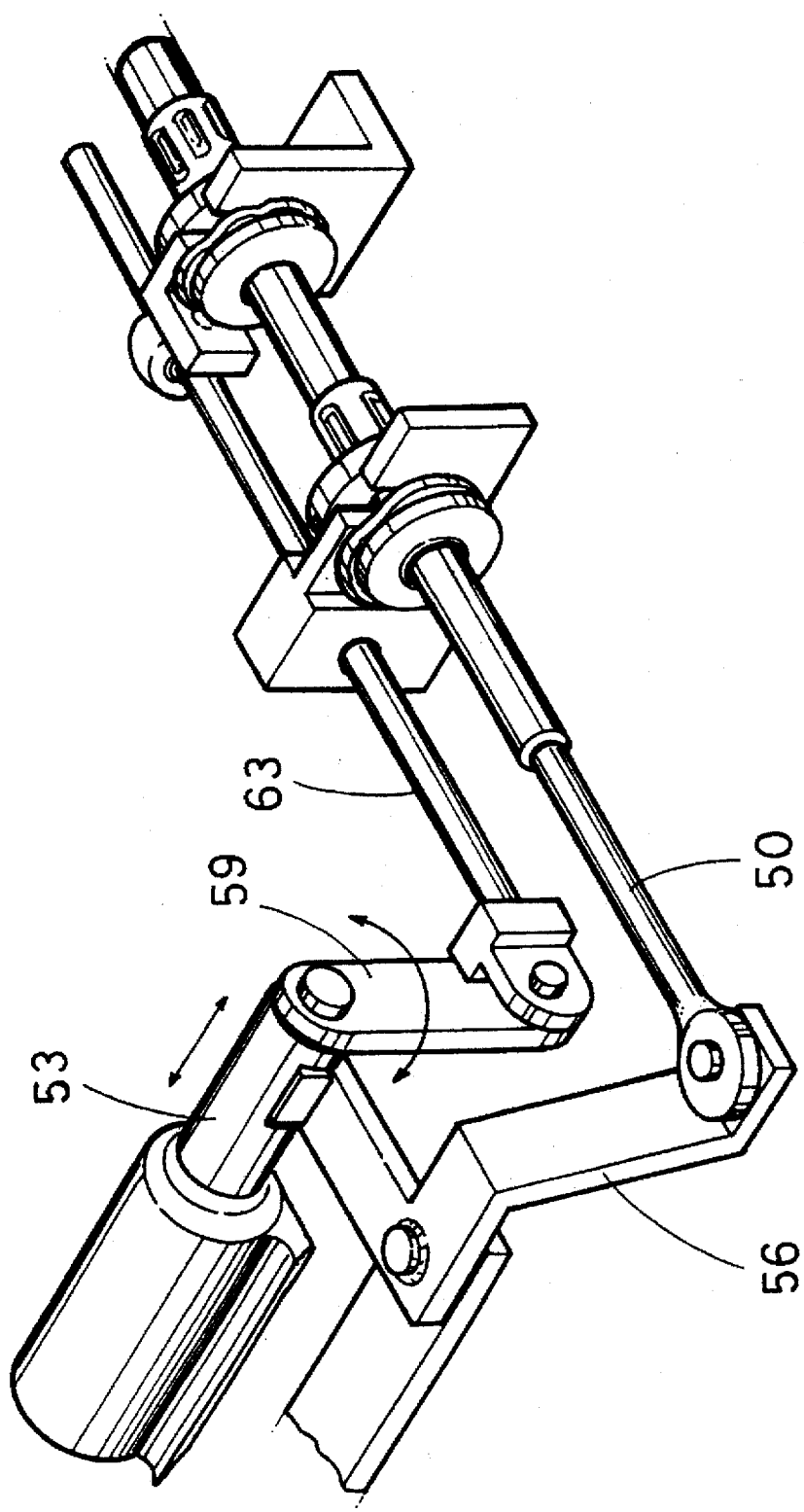
FIG. 9 is a view similar to FIG. 7, illustrating fragmentarily a variant of the controller control lever mechanism.

An embodiment fragmentarily shown in FIG. 9 is similar to the embodiment of FIGS. 7 and 8 except that the rod 50 connected to the wire 17 (not shown) is connected also to the bell crank 56 and the slide shaft 63 is connected to the arm 59 so that the shaft 53 may be moved back and forth and rotated, respectively.

Figure 10:
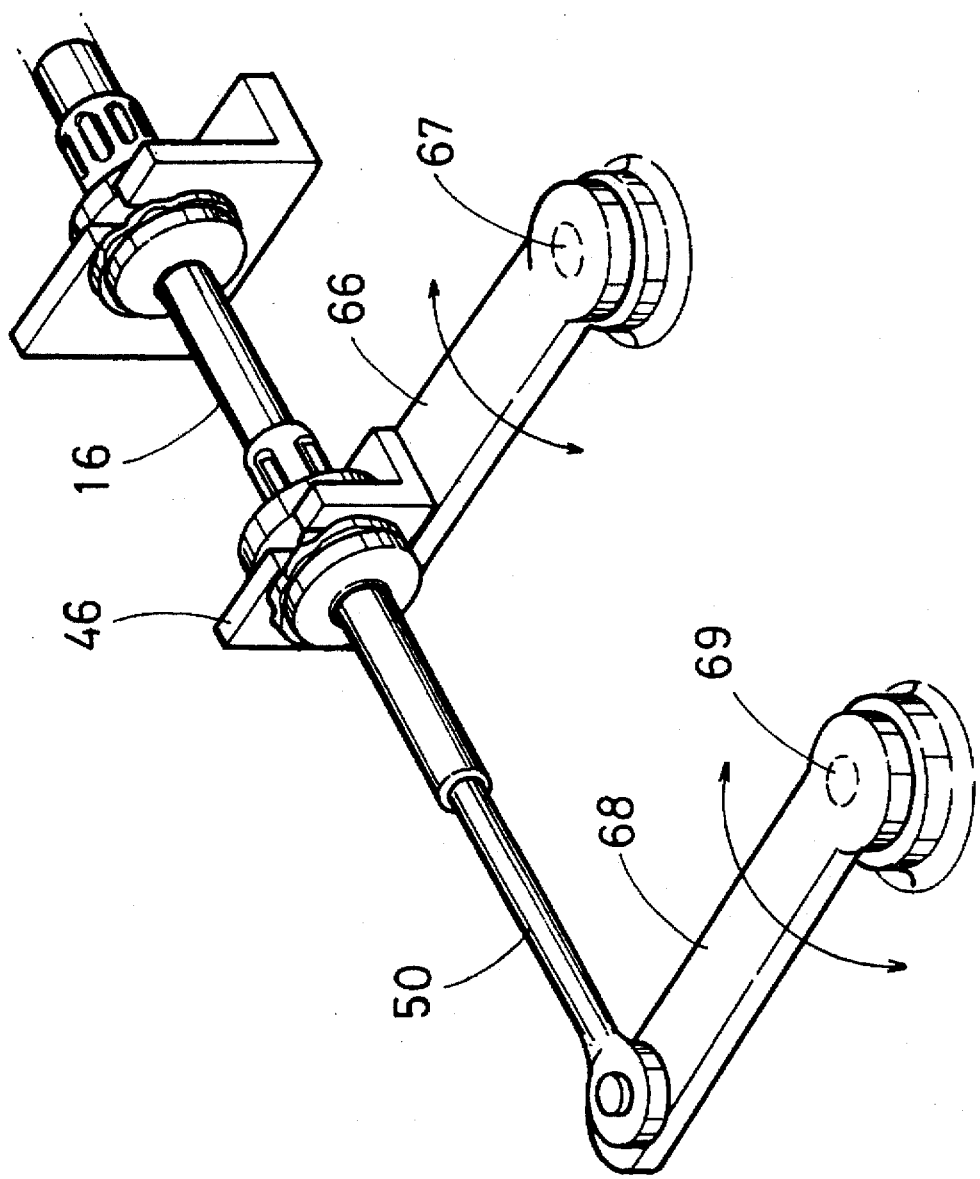
FIG. 10 is a view similar to FIG. 7, illustrating fragmentarily another variant of the controller control lever mechanism.

An embodiment fragmentarily shown by FIG. 10 is similar to the embodiment of FIGS. 7 and 8 except that the rod 50 connected to the wire 17 (not shown) is connected also to a first lever 68 while the movable bracket 46 coupled to the inner tube 16 is connected to a second lever 66 so that the first and second lever 68, 66 may rock as the inner tube 16 and the wire 17 are actuated and thereby shafts projecting from the transmission casing are rotated to transmit the operating forces in the SELECT- and SHIFT-directions, respectively, to the transmission unit.

I claim:
1. A vehicle transmission controller for remote operation and control of mode mechanisms of a motor vehicle having a SELECT-mode mechanism and a SHIFT-mode mechanism comprising:

a control lever mechanism mounting a rockable control lever in a neutral position and actuatable selectively by rocking the control lever back and forth in selected directions of movement relative to said neutral position;

a single triple-structure control cable connected to said control lever mechanism and extending therefrom and connected to said mode mechanisms for transmitting longitudinally operating forces to said mode mechanisms individually under control of the control lever mechanism and the rockable control lever thereof; and the control cable consisting of an outer tube mounted stationary on the vehicle to avoid frictional wear and tear on the control cable from vehicle parts and for ease of mounting, said outer tube extending from said control lever mechanism to a vicinity of the mode mechanisms, an inner tube disposed coaxially in the outer tube selectively slidably driven longitudinally in the outer tube along substantially a length of the outer tube for protecting of the inner tube from sliding contact with vehicle parts disposed along the length of the outer tube, and a length of wire disposed in the inner tube selectively slidably driven longitudinally in the inner tube along a length of the inner tube, and said inner tube and said wire each individually driven independently longitudinally in response to a corresponding direction of movement of the control lever for transmitting independently operating forces respectively to a corresponding individual mode mechanism.

2. A vehicle transmission controller according to claim 1, in which said rockable control lever is manually operable.

3. A vehicle transmission controller according to claim 1, including means for fixing an end of said control cable outer tube stationary on said control lever mechanism and means for fixing an opposite end thereof fixed stationary in the vicinity of said mode mechanisms.

4. A vehicle transmission controller according to claim 1, in which said inner tube and said length of wire each have a respective end connected to said control lever mechanism and each have a respective opposite end connected remote from said control lever mechanism for effecting transmitting of operation forces to a corresponding mode mechanism and effectively transmitting respective operating forces thereto individually and independently.

5. A vehicle transmission controller according to claim 1, in which said neutral position of said control lever is an upright position of the control lever.

6. A vehicle transmission controller for remote operation of and control of mode mechanisms of a motor vehicle having a SELECT-mode mechanism and a SHIFT-mode mechanism comprising:

a control lever mechanism mounting a rockable control lever upright in a neutral position and actuatable selectively by rocking the control lever in selected directions for selectively transmitting operating forces individually and independently to a corresponding mode mechanism in dependence upon a corresponding selected direction of movement of the rockable control lever;

a single triple-structure control cable for transmitting the operating forces alternatively and independently to each mode mechanism individually under control of the control lever mechanism and the control lever thereof;

the control cable comprising an outer tube mounted fixed stationary on the vehicle to avoid frictional wear and tear on the control cable, an inner tube selectively slidably driven longitudinally in the outer tube along the length thereof and a length of wire dispose in the inner tube each being driven independently longitudinally in response to a corresponding direction of movement of the control lever for transmitting independently operating tiptoes respectively to a corresponding individual mode mechanism, opposite ends of the outer tube connected stationary on the control lever mechanism and adjacent to the mode mechanisms, respective ends of the inner tube and the length of wire therein connected to the control lever mechanism for independent driving thereof longitudinally, and means for connecting respective opposite ends of the inner tube and length of wire to a corresponding mode mechanism for transmitting independently operating forces thereto; and the control lever being actuated from said upright position in said selected directions for transmitting via said control cable operating forces individually to a corresponding mode mechanism for operating thereof.

7. A vehicle transmission operation method for remote operation and control of mode mechanisms of a motor vehicle having a SELECT-mode mechanism and a SHIFT-mode mechanism comprising:

providing on the motor vehicle a controller having a control lever mechanism mounting a rockable control lever in a neutral position and actuatable selectively by rocking the control lever in selected directions for selectively transmitting operating forces individually and independently to a corresponding mode mechanism in dependence upon a corresponding selected direction of movement of the rockable control lever;

providing the controller and control lever mechanism thereof with a single triple-structure control cable for transmitting the operating forces alternatively and independently to each mode mechanism individually under control of the control lever mechanism and the control lever thereof;

the triple-structure control cable consisting of an outer tube mounted fixed stationary on the vehicle to avoid frictional wear and tear on the control cable, an inner tube slidably driven longitudinally in the outer tube along a full length thereof, and a length of wire slidably driven longitudinally in the inner tube and said inner tube and said wire each driven longitudinally in response to a corresponding direction of movement of the control lever for transmitting independently operating forces respectively to a corresponding individual mode operating mechanism, connecting in a suitable sequence opposite ends of the outer tube stationary on the control lever mechanism and adjacent to the mode mechanisms, and connecting respective ends of the inner tube and length of wire therein to the control lever for independent driving thereof longitudinally and respective opposite ends of the inner tube and length of wire to a corresponding operating mechanism for transmitting independently said operating forces; and selectively actuating the control lever in said selected directions for transmitting via said control cable operating forces individually to a corresponding mode mechanism for operating thereof.

* * * * *